United States Patent
Kang et al.

(10) Patent No.: US 11,996,571 B2
(45) Date of Patent: May 28, 2024

(54) BATTERY PACK INCLUDING UPPER FRAME HAVING OBLIQUELY OPENED HINGE FASTENED TO SIDE FRAME, AND DEVICE INCLUDING THE SAME

(71) Applicant: LG Chem, Ltd., Seoul (KR)

(72) Inventors: Dahoon Kang, Daejeon (KR); Jae Hyeon Ju, Daejeon (KR); Jisu Yoon, Daejeon (KR); Kyoungho Seo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 611 days.

(21) Appl. No.: 17/273,452

(22) PCT Filed: Feb. 17, 2020

(86) PCT No.: PCT/KR2020/002217
§ 371 (c)(1),
(2) Date: Mar. 4, 2021

(87) PCT Pub. No.: WO2020/171500
PCT Pub. Date: Aug. 27, 2020

(65) Prior Publication Data
US 2021/0336307 A1   Oct. 28, 2021

(30) Foreign Application Priority Data
Feb. 18, 2019  (KR) .................. 10-2019-0018721

(51) Int. Cl.
*H01M 50/209*   (2021.01)
*H01M 50/204*   (2021.01)
(Continued)

(52) U.S. Cl.
CPC ....... *H01M 50/209* (2021.01); *H01M 50/204* (2021.01); *H01M 50/249* (2021.01); *H01M 50/262* (2021.01); *H01M 2220/20* (2013.01)

(58) Field of Classification Search
CPC ............ H01M 50/209; H01M 50/249; H01M 50/262; H01M 50/204
(Continued)

(56) References Cited

U.S. PATENT DOCUMENTS

| 9,425,488 | B2 | 8/2016 | Seo et al. |
| 9,819,002 | B2 | 11/2017 | Kim |

(Continued)

FOREIGN PATENT DOCUMENTS

| CN | 101651191 A | 2/2010 |
| CN | 102569707 A | 7/2012 |

(Continued)

OTHER PUBLICATIONS

"Stack." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1293698. (Year: 2010).*

(Continued)

*Primary Examiner* — Sean P Cullen
(74) *Attorney, Agent, or Firm* — Lerner David LLP (57) ABSTRACT

A battery pack includes: a battery module formed by stacking battery cells; an upper frame positioned on an upper surface of the battery module; a first side frame positioned on a first side surface of the battery module; and a second side frame positioned on a second side surface of the battery module facing the first side frame. The upper frame includes one or more first hinge parts positioned at one end of the upper frame. The first side frame includes one or more first poles positioned at an upper edge of the first side frame and fastened to the first hinge part. A first opening into which the first pole is inserted is formed in the first hinge part, and the (Continued)

first opening is formed obliquely so as to face between a direction perpendicular to the upper frame and a direction parallel to the upper frame.

10 Claims, 6 Drawing Sheets

(51) Int. Cl.
*H01M 50/249* (2021.01)
*H01M 50/262* (2021.01)

(58) Field of Classification Search
USPC .......................................... 429/156, 158, 159
See application file for complete search history.

(56) References Cited

U.S. PATENT DOCUMENTS

| | | |
|---|---|---|
| 2002/0076607 A1 | 6/2002 | Chang |
| 2010/0039757 A1 | 2/2010 | Yu |
| 2012/0067914 A1 | 3/2012 | Sadler et al. |
| 2014/0308568 A1 | 10/2014 | Kim |
| 2019/0348720 A1 | 11/2019 | Oh et al. |
| 2019/0389318 A1 | 12/2019 | Lee et al. |
| 2020/0014005 A1 | 1/2020 | Lee et al. |

FOREIGN PATENT DOCUMENTS

| | | | |
|---|---|---|---|
| CN | 103228550 A | 7/2013 | |
| CN | 108511657 A | 9/2018 | |
| JP | H06050388 U | 7/1994 | |
| JP | H07137544 A | 5/1995 | |
| JP | H11208699 A | 8/1999 | |
| JP | H11250882 A | 9/1999 | |
| JP | 2003249207 A | 9/2003 | |
| JP | 2008082442 A | 4/2008 | |
| JP | 2014500198 A | 1/2014 | |
| JP | 2016143554 A | 8/2016 | |
| JP | 2017004744 A | 1/2017 | |
| JP | 2017216200 A | 12/2017 | |
| KR | 19990009680 U | 3/1999 | |
| KR | 20080057050 A | 6/2008 | |
| KR | 200441079 Y1 | 7/2008 | |
| KR | 101329734 B1 | 11/2013 | |
| KR | 101412014 B1 | 6/2014 | |
| KR | 20140124242 A | 10/2014 | |
| KR | 2015109726 A * | 10/2015 | |
| KR | 20150109726 A | 10/2015 | |
| KR | 20180078777 A | 7/2018 | |
| KR | 20180078778 A | 7/2018 | |
| KR | 20180091325 A | 8/2018 | |
| KR | 20180099437 A | 9/2018 | |
| KR | 20180099438 A | 9/2018 | |
| KR | 101928072 B1 | 12/2018 | |
| KR | 2019027096 A * | 3/2019 | .............. B60L 50/64 |
| WO | WO-2018124751 A1 * | 7/2018 | .............. B60L 50/64 |

OTHER PUBLICATIONS

Extended European Search Report for European Patent Application No. 20759835.0 dated Sep. 20, 2021, 3 pgs.
International Search Report for Application No. PCT/KR2020/002217, dated Jun. 2, 2020, pp. 1-2.
Search Report dated Jul. 18, 2022 from Office Action for Chinese Application No. 202080004496.3 issued Jul. 22, 2022. 3 pgs.

* cited by examiner

BATTERY PACK INCLUDING UPPER FRAME HAVING OBLIQUELY OPENED HINGE FASTENED TO SIDE FRAME, AND DEVICE INCLUDING THE SAME

CROSS REFERENCE TO RELATED APPLICATIONS

This application is a national phase entry under 35 U.S.C. § 371 of PCT/KR2020/002217, filed on Feb. 17, 2020, and claims the benefit of Korean Patent Application No. 10-2019-0018721, filed on Feb. 18, 2019, with the Korean Intellectual Property Office, the disclosures of which are each incorporated herein by reference in their entirety.

TECHNICAL FIELD

The present disclosure relates to a battery pack and a device including the same, and more particularly, to a battery pack including a battery module, and a device including the same.

BACKGROUND ART

In modern society, as portable devices such as a mobile phone, a notebook computer, a camcorder and a digital camera has been daily used, the development of technologies in the fields related to mobile devices as described above has been activated. In addition, rechargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel, and therefore, there is an increasing need for development of the secondary battery.

Currently commercialized secondary batteries include a nickel cadmium battery, a nickel hydrogen battery, a nickel zinc battery, and a lithium secondary battery. Among them, the lithium secondary battery has come into the spotlight because they have advantages, for example, hardly exhibiting memory effects compared to nickel-based secondary batteries and thus being freely charged and discharged, and having very low self-discharge rate and high energy density.

Such lithium secondary battery mainly uses a lithium-based oxide and a carbonaceous material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator being interposed between them, and an exterior material, i.e., battery case, which seals and accommodates the electrode assembly, together with an electrolyte.

Generally, the lithium secondary battery may be classified into a can-type secondary battery in which the electrode assembly is embedded in a metal can, and a pouch-type secondary battery in which the electrode assembly is embedded in a pouch of an aluminum laminate sheet, depending on the shape of the exterior material.

In the case of a secondary battery used for a small-sized device, two to three battery cells are arranged, but in the case of a secondary battery used for a medium- to large-sized device such as an automobile, a battery pack in which a large number of battery cells are electrically connected is used.

This battery pack usually includes a plurality of secondary batteries, and the plurality of secondary batteries are connected to each other in series and in parallel to enhance the capacity and output. Such a battery pack includes a battery module formed by stacking a plurality of secondary batteries, i.e. battery cells, a battery module frame accommodating the battery module in an inner space, and a housing surrounding the battery module frame.

DETAILED DESCRIPTION OF THE INVENTION

Technical Problem

Embodiments of the present disclosure are directed to provide a battery pack with improved durability by improving a coupling force between battery module frames constituting the battery pack, and a device including the battery pack.

Technical Solution

A battery pack according to one embodiment of the present disclosure comprises: a battery module formed by stacking one or more battery cells; an upper frame positioned on an upper surface of the battery module; a first side frame positioned on a first side surface of the battery module; and a second side frame positioned on a second side surface of the battery module so as to face the first side frame, wherein the upper frame includes one or more first hinge parts positioned at one end of the upper frame, wherein the first side frame includes one or more first poles positioned at an upper edge of the first side frame and fastened to the first hinge part, wherein a first opening into which the first pole is inserted is formed in the first hinge part, and wherein the first opening is formed obliquely so as to face between a direction perpendicular to the upper frame and a direction parallel to the upper frame.

The first opening may be formed obliquely inward so as to face the battery module.

The first opening may be formed obliquely outward so as to face an area outside of the battery module.

The upper frame includes one or more second hinge parts positioned at an end opposite to the first hinge part, and the second side frame includes one or more second poles positioned at an upper edge of the second side frame and fastened to the second hinge part, wherein a second opening into which the second pole is inserted is formed in the second hinge part, wherein the second opening may be formed obliquely so as to face between a direction perpendicular to the upper frame and a direction parallel to the upper frame.

The first opening and the second opening may be formed to be inclined in a direction facing each other.

The first opening and the second opening may be formed to be inclined in opposite directions to each other.

The first opening may form an angle of 60 degrees to 70 degrees from a direction parallel to the upper frame.

The one or more first hinge parts may include a plurality of hinged parts spaced from one another along one end of the upper frame; and the one or more first poles may include a plurality of first poles spaced from one another along an upper edge of the first side frame.

A gap of the first opening may be smaller than a diameter of the first pole in order to fasten the first pole to the first hinge part.

Advantageous Effects

According to embodiments of the present disclosure, the coupling force between battery module frames is improved by adjusting a direction of an opening formed in a hinge part, thereby providing a battery pack with improved durability.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments forth herein.

Pails that are irrelevant to the description will be omitted to clearly describe the present disclosure, and like reference numerals designate like elements throughout the specification.

Further, in the drawings, the size and thickness of each element are arbitrarily, illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper side of the reference portion toward the opposite direction of gravity.

Further, throughout the specification, when a part is referred to as "including" a certain component, it means that it can further include other components, without excluding the other components, unless otherwise stated.

Figure 1:
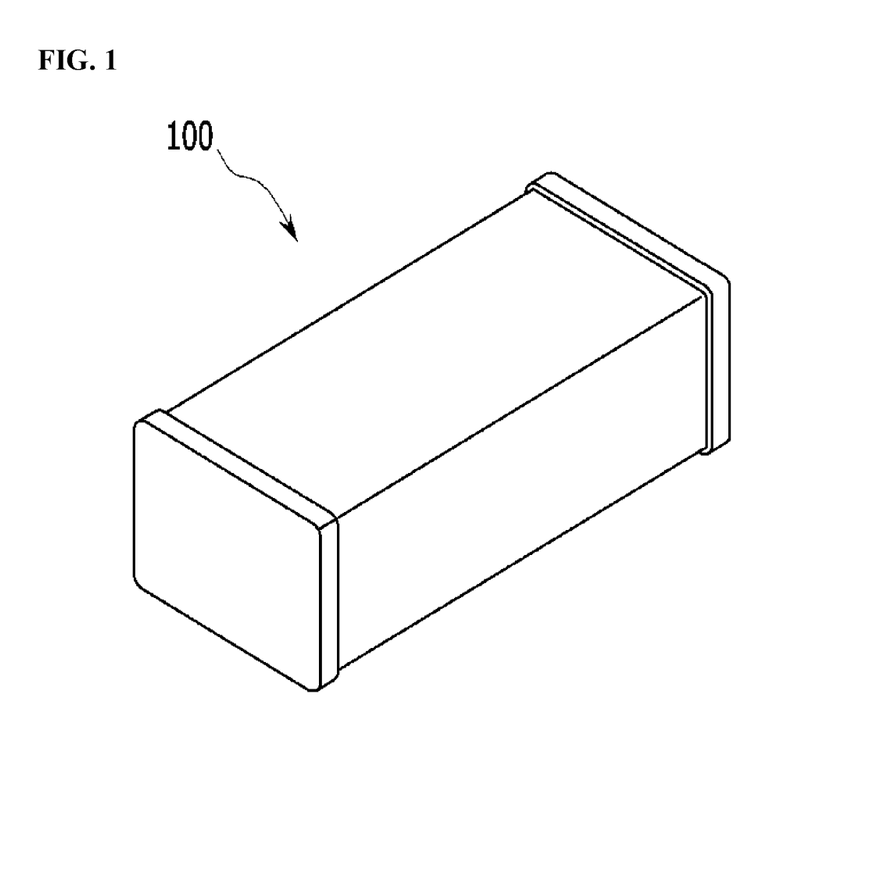
FIG. 1 is a perspective view of a battery pack according to one embodiment of the present disclosure.
Figure 2:
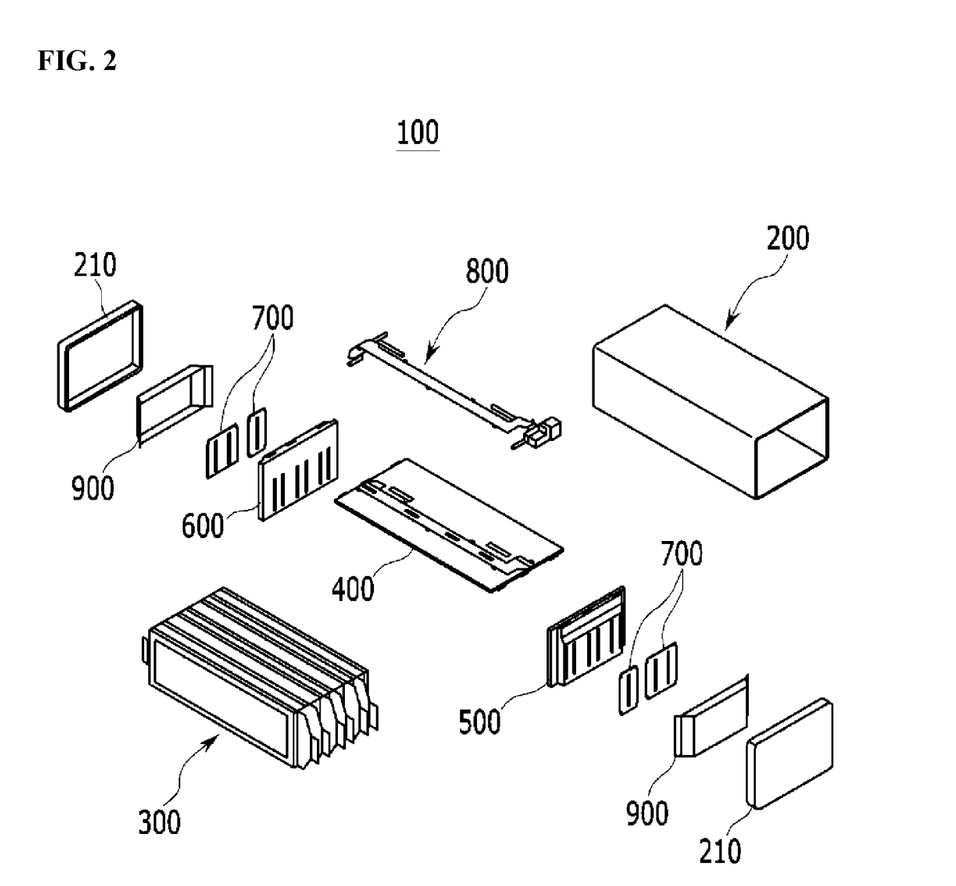
FIG. 2 is an exploded perspective view of the battery pack of FIG. 1.

FIG. 1 is a perspective view of a battery pack 100 according to one embodiment of the present disclosure, and FIG. 2 is an exploded perspective view of the battery pack 100 of FIG. 1.

Referring to FIGS. 1 and 2, the battery pack 100 according to one embodiment of the present disclosure comprises: a battery module 300 formed by stacking one or more battery cells; an upper frame 400 positioned on an upper surface of the battery module 300; a first side frame 500 positioned on one side surface of the battery module 300; and a second side frame 600 positioned on the other side surface of the battery module 300 so as to face the first side frame 500.

In addition, the battery pack 100 may include a housing 200 surrounding the battery module 300 while both opposite sides being opened, and a cover 210 covering both sides.

Further, the battery pack 100 may include a plurality of busbars 700 disposed on the first side frame 500 and the second side frame 600 and connected to electrode leads of the battery cells constituting the battery module 300.

Meanwhile, an insulating cover 900 may be disposed between the plurality of busbars 700 and the cover 210, and a flexible printed circuit board 800 may be disposed on an upper surface of the upper frame 400.

Figure 3:
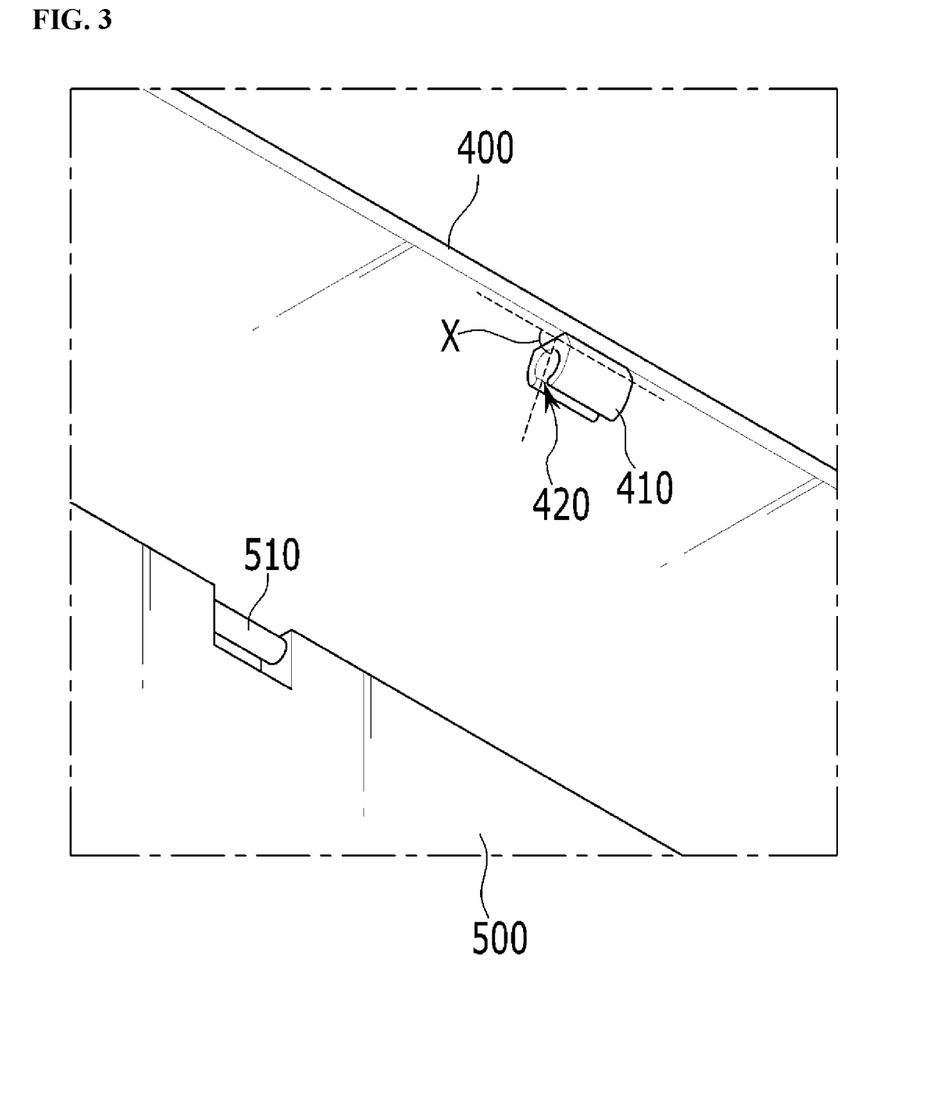
FIG. 3 is an enlarged partial view of an upper frame and a first side frame in FIG. 2.
Figure 4:
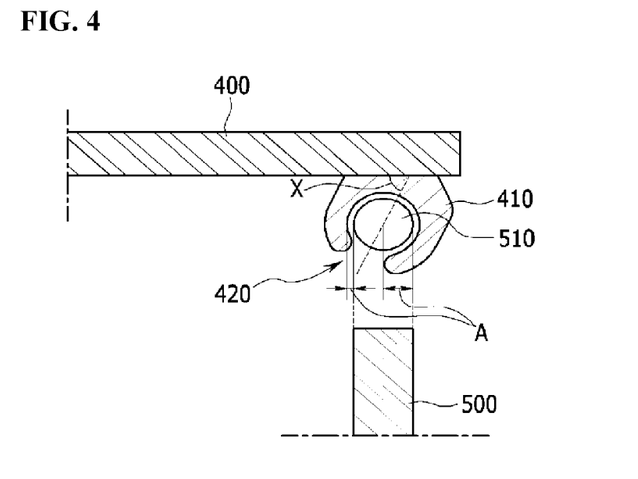
FIG. 4 is a cross-sectional view of an upper frame and a first side frame in FIG. 3.

FIG. 3 is an enlarged partial view of the upper frame 400 and the first side frame 500 in FIG. 2, and FIG. 4 is a cross-sectional view of the upper frame 400 and the first side frame 500 in FIG. 3. Specifically, FIG. 3 shows a state before the upper frame 400 and the first side frame 500 are fastened, and FIG. 4 shows a state after the upper frame 400 and the first side frame 500 are fastened.

Referring to FIGS. 3 and 4, the upper frame 400 includes one or more first hinge parts 410, and the first side frame 500 includes one or more first poles 510.

The first hinge part 410 is positioned at one end of the upper frame 400, and the first pole 510 is positioned at an upper edge of the first side frame 500.

The first pole 510 has a shape in which a cylindrical rod extends in a direction parallel to the first side frame 500, and a first opening 420 into which the first pole 510 is inserted is formed in the first hinge part 410. In particular, an interior of the first hinge part 410 has a space where the first pole 510 can be positioned, and a gap of the first opening 420 is smaller than a diameter of the first pole 510, and therefore, the first hinge part 410 and the first pole 510 can form a hinge coupling. Thereby, the upper frame 400 and the first side frame 500 is coupled.

Further, the first hinge part 410 may be two or more, and may be spaced apart along one end of the upper frame 400. Likewise, the first pole 510 fastened to the first hinge part 410 may be two or more, and may be spaced apart along an upper edge of the first side frame 500. If the first hinge part 410 and the first pole 510 are two or more, it is needless to say that the upper frame 400 and the first side frame 500 can be more firmly coupled.

In this case, the first opening 420 according to the present embodiment is formed obliquely so as to face between a direction perpendicular to the upper frame 400 and a direction parallel to the upper frame 400. Specifically, referring back to FIG. 4, the first opening 420 may be formed obliquely inward so as to face the battery module.

Specifically, the first opening 420 may be formed obliquely such that an angle X from a direction parallel to the upper frame 400 forms 60 degrees to 70 degrees. Consequently, it can be seen that a locking amount A between the first hinge part 410 and the first pole 510 with respect to a direction of gravity is increased. Here, the direction of gravity means a downward direction among directions perpendicular to the upper frame 400.

Figure 5:
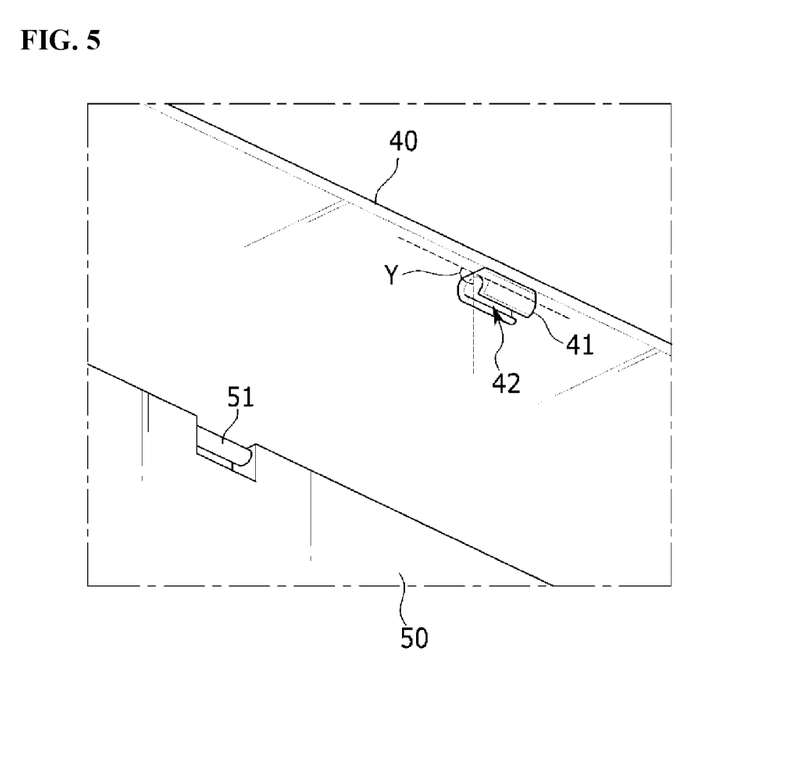
FIG. 5 is an enlarged partial view of an upper frame and a first side frame according to a comparative example.
Figure 6:
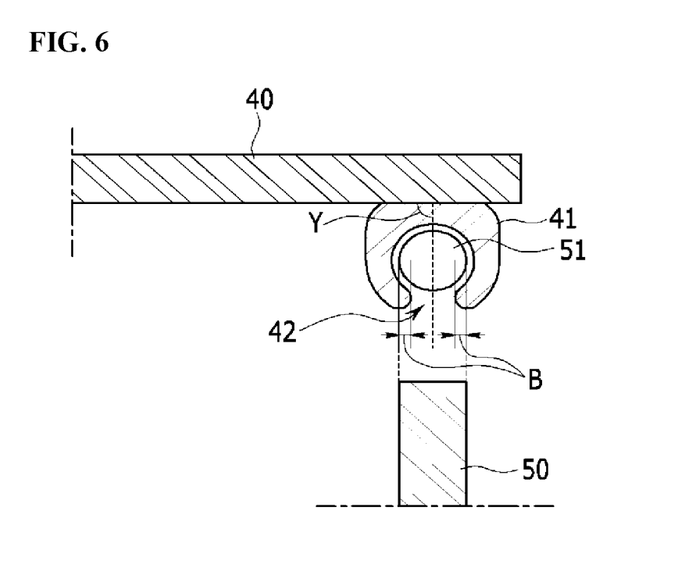
FIG. 6 is a cross-sectional view of an upper frame and a first side frame in FIG. 5.

FIG. 5 is an enlarged partial view of an upper frame 40 and a first side frame 50 according to a comparative example, and FIG. 6 is a cross-sectional view of the upper frame 40 and the first side frame 50 in FIG. 5. Specifically, FIG. 5 shows a state before the upper frame 40 and the first side frame 50 are fastened, and FIG. 6 shows a state after the upper frame 40 and the first side frame 50 are fastened.

Referring to FIGS. 5 and 6, the upper frame 40 according to the comparative example includes one or more hinge parts 41, and the first side frame 50 includes a pole 51. Except that an opening 42 facing a direction perpendicular to the upper frame 40 is formed in the hinge part 41, the configuration is identical to one embodiment of the present disclosure described above, and thus, detailed descriptions of overlapping parts will be omitted.

The opening 42 of the hinge part 41 according to the comparative example is a fastening method of the conventional hinge coupling, and is formed to face a direction perpendicular to the upper frame 40. Specifically, an angle Y between the opening 42 and a direction parallel to the upper frame 40 forms 90 degrees.

Referring to FIGS. 4 and 6 together, it can be seen that, based on the direction of gravity, a locking amount A between the first hinge part 410 and the first pole 510 according to the present embodiment is increased than a locking amount B between the hinge part 41 and the pole 51 according to the comparative example. That is, the first opening 420 of the first hinge part 410 is formed to be inclined at a predetermined angle, thereby increasing the locking amount of the hinge coupling as well as the fastening angle. Therefore, a degree of coupling between the upper frame 400 and the first side frame 500 is improved than in the prior art, thereby preventing the frame from being separated.

Meanwhile, as mentioned above, the first opening 420 may be formed obliquely such that an angle X from a direction parallel to the upper frame 400 forms 60 degrees to 70 degrees. If the angle X is greater than 70 degrees, the locking amount between the first hinge part 410 and the first pole 510 based on the direction of gravity is insufficient, and thus, separation between the frames cannot be prevented. On the other hand, if the angle X is less than 60 degrees, the locking amount in a direction perpendicular to the direction of gravity is reduced, and thus, separation between the frames cannot be prevented.

Meanwhile, although not specifically illustrated, even in a second side frame 600 in FIG. 2, mutually identical or similar configurations to the first side frame 500 may also be applied. That is, the second side frame 600 may include a second pole positioned at an upper edge thereof, and the upper frame 400 may include one or more second hinge pails positioned at ends opposite to the first hinge part 410. Specifically, a second opening into which the second pole is inserted may be formed in the second hinge part, and the second opening may be formed obliquely so as to face between a direction perpendicular to the upper frame 400 and a direction parallel to the upper frame 400.

However, the second opening is preferably formed obliquely inward so as to face the battery module. That is, in the first hinge part 410 and the second hinge part positioned at opposite ends of the upper frame 400, the first opening 420 of the first hinge part 410 and the second opening of the second hinge part are preferably formed to be inclined in a direction facing each other. Since the fastening directions of the first hinge part 410 and the second hinge part face each other, the fastening directions facing each other form a mutually complementary relationship even if a force is applied to the upper frame 400 in a specific direction, whereby a degree of coupling of the upper frame 400 to the first side frame 500 and the second side frame 600 can be further improved.

Figure 7:
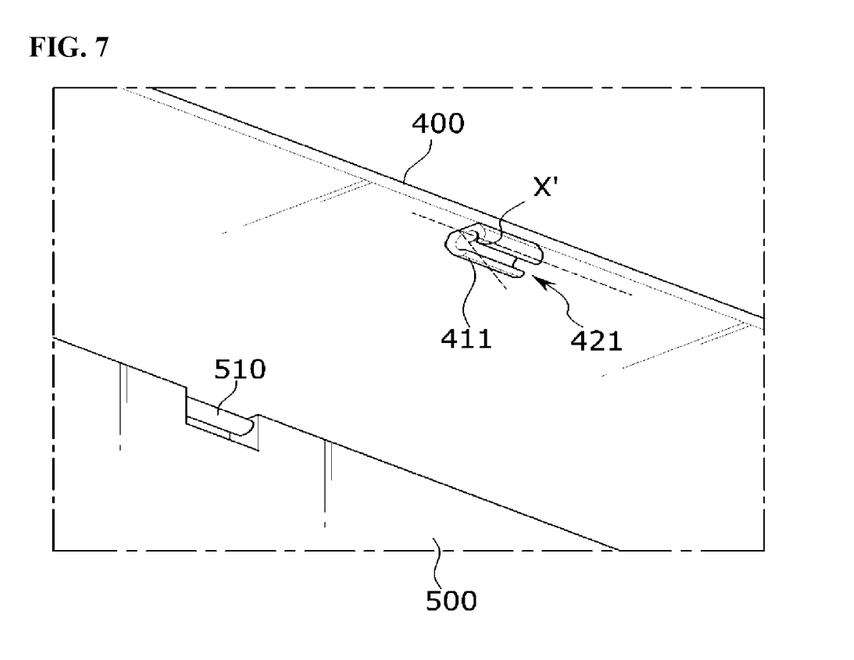
FIG. 7 is an enlarged partial view of an upper frame and a first side frame according to another embodiment of the present disclosure.
Figure 8:
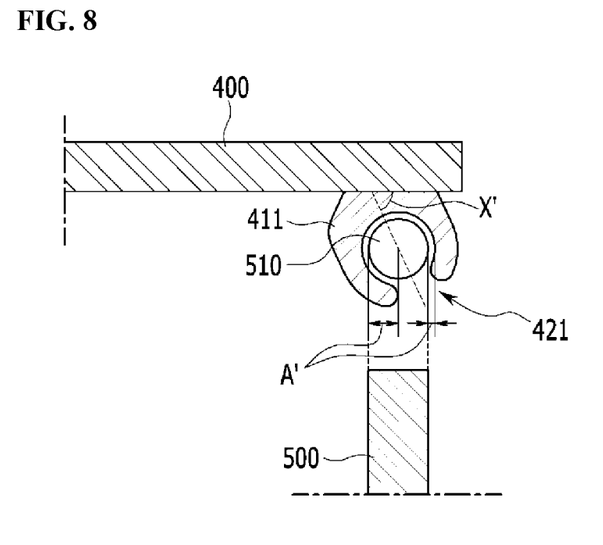
FIG. 8 is a cross-sectional view of an upper frame and a first side frame in FIG. 7.

FIG. 7 is an enlarged partial view of an upper frame 400 and a first side frame 500 according to another embodiment of the present disclosure, and FIG. 8 is a cross-sectional view of the upper frame and the first side frame in FIG. 7. Specifically, FIG. 7 shows a state before the upper frame 400 and the first side frame 500 are fastened, and FIG. 8 shows a state after the upper frame 400 and the first side frame 500 are fastened.

In the following, another embodiment of the present disclosure will be described.

Referring to FIGS. 7 and 8, the upper frame 400 includes a first hinge part 411, and the first side frame 500 includes a first pole 510. Except for an inclined direction of the first opening 421 formed in the first hinge part 411, other configurations are mutually identical or similar to those of the above-described embodiment of the present disclosure, and thus, detailed descriptions thereof will be omitted.

The first opening 421 according to another embodiment of the present disclosure is formed obliquely so as to face between a direction perpendicular to the upper frame 400 and a direction parallel to the upper frame 400, but as shown in FIGS. 7 and 8, it may be formed obliquely outward so as to face an area opposite to the battery module.

The first opening 421 may be formed obliquely such that an angle X' from a direction parallel to the upper frame 400 forms 60 degrees to 70 degrees, whereby the locking amount A' between the first hinge part 411 and the first pole 510 with respect to the direction of gravity may be increased.

Meanwhile, although not specifically illustrated, a second side frame facing the first side frame 500 may be disposed on the side surface of the upper frame 400; one or more second poles may be formed at an upper edge of the second side frame; and a second hinge part fastened to the second pole may be formed in the upper frame 400. In this case, it is needless to say that the second hinge part is positioned at an end of the upper frame 400 facing the first hinge part 411.

A second opening into which the second pole is inserted may be formed in the second hinge part, and the second opening may be formed obliquely so as to face between a direction perpendicular to the upper frame 400 and a direction parallel to the upper frame 400.

However, it is preferable that the second opening is formed obliquely outward so as to face an area opposite to the battery module. That is, in the first hinge part 411 and the second hinge part positioned at opposite ends of the upper frame 400, the first opening 421 of the first hinge part 411 and the second opening of the second hinge part are preferably formed to be inclined in directions opposite to each other. Since the fastening directions of the first hinge part 411 and the second hinge part are opposite to each other, the fastening directions opposite to each other form a mutually complementary relationship even if a force is applied to the upper frame 400 in a specific direction, whereby a degree of coupling of the upper frame 400 to the first side frame 500 and the second side frame can be further improved.

The above-mentioned the battery pack can be applied to various devices. Such devices include, but not limited to, transportation means such as an electric bicycle, an electric vehicle, and a hybrid vehicle, and the present disclosure is applicable to various devices capable of using any battery module and any battery pack including the same, which also falls under the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery pack
200: housing

300: battery module
400: upper frame
410: first hinge part
420: first opening
500: first side frame
510: first pole

The invention claimed is:

1. A battery pack comprising:
a battery module formed by stacking a plurality of battery cells;
an upper frame positioned on an upper surface of the battery module;
a first side frame positioned on a first side surface of the battery module and having a portion on which a first busbar is disposed, the first side frame including one or more first poles positioned at an upper edge of the first side frame; and
a second side frame positioned on a second side surface of the battery module so as to face the first side frame,
wherein the upper frame includes one or more first hinge parts positioned at one end of the upper frame, the one or more first hinge parts defining a first opening extending along an axis for securing the one or more first poles, the first opening defining a first gap through which the one or more first poles is inserted, and
wherein the first opening is formed at an oblique angle such that a plane passing through the axis of the first opening and a midpoint of the first gap extends between a direction perpendicular to the upper frame and a direction parallel to the upper frame.

2. The battery pack of claim 1, wherein the first opening is formed obliquely inward so as to face the battery module.

3. The battery pack of claim 1, wherein the first opening is formed obliquely outward so as to face an area outside of the battery module.

4. The battery pack of claim 1, wherein the first opening forms an angle of 60 degrees to 70 degrees from the direction parallel to the upper frame.

5. The battery pack of claim 1, wherein the gap of the first opening is smaller than a diameter of the first pole in order to fasten the first pole to the first hinge part.

6. The battery pack of claim 1, wherein the one or more first hinge parts comprises a plurality of first hinge parts that are spaced apart from one another along the one end of the upper frame; and
the one or more first poles comprises a plurality of first poles that are spaced apart from one another along the upper edge of the first side frame.

7. The battery pack of claim 1, wherein
the upper frame includes one or more second hinge parts positioned at an end opposite to the one or more first hinge parts,
the second side frame includes one or more second poles positioned at an upper edge of the second side frame and fastened to the second hinge part,
a second opening into which the second pole is inserted is formed in the second hinge part, and
the second opening is formed obliquely so as to face between the direction perpendicular to the upper frame and the direction parallel to the upper frame.

8. The battery pack of claim 7, wherein the first opening and the second opening are formed to be inclined in a direction facing each other.

9. The battery pack of claim 7, wherein the first opening and the second opening are formed to be inclined in opposite directions to each other.

10. A device comprising the battery pack according to claim 1.

* * * * *